(12) United States Patent
Sébire et al.

(10) Patent No.: US 7,573,844 B2
(45) Date of Patent: Aug. 11, 2009

(54) ALLOCATING MEMORY RESOURCES OF MOBILE STATION

(76) Inventors: Guillaume Sébire, Munkkiniemen puistotie 10 B 29, FIN-00330 Helsinki (FI); Raino Lintulampi, Teponkentäntie 9, FIN-90810 Kiviniemi (FI); Henri Koskinen, Zanseninkuja 2 B 41, FIN-02600 Espoo (FI)

(*) Notice: Subject to any disclaimer, the term of this patent is extended or adjusted under 35 U.S.C. 154(b) by 1303 days.

(21) Appl. No.: 10/301,862

(22) Filed: Nov. 22, 2002

(65) Prior Publication Data

US 2003/0118043 A1 Jun. 26, 2003

(30) Foreign Application Priority Data

Nov. 23, 2001 (FI) ................................. 20012298

(51) Int. Cl.
*H04W 40/24* (2006.01)
(52) U.S. Cl. ........................................ 370/329; 370/341
(58) Field of Classification Search ................ 370/229, 370/230, 230.1, 231, 235, 328, 329, 340, 370/341, 431, 433, 437; 455/450–455
See application file for complete search history.

(56) References Cited

U.S. PATENT DOCUMENTS

| | | | |
|---|---|---|---|
| 6,683,860 B1 | 1/2004 | Forssell et al. | |
| 6,747,962 B2 * | 6/2004 | Lintulampi et al. | 370/329 |
| 6,891,818 B1 * | 5/2005 | Jarvisalo et al. | 370/337 |
| 6,944,459 B2 * | 9/2005 | Parantainen et al. | 455/452.1 |
| 6,947,383 B2 * | 9/2005 | Bauer et al. | 370/235 |
| 2002/0160784 A1 | 10/2002 | Kuwahara et al. | |

FOREIGN PATENT DOCUMENTS

| | | |
|---|---|---|
| EP | 1 231 745 A2 | 8/2002 |
| JP | 2001339771 | 12/2001 |
| JP | 2002-330166 | 11/2002 |
| JP | 2002-539680 | 11/2002 |
| WO | WO 00/52868 | 9/2000 |
| WO | WO 00/54464 | 9/2000 |
| WO | WO 02/093968 | 11/2002 |

* cited by examiner

*Primary Examiner*—Wing F Chan
*Assistant Examiner*—Duc T Duong
(74) *Attorney, Agent, or Firm*—Connolly Bove Lodge & Hutz LLP (57) ABSTRACT

The invention relates to allocating memory resources for packet data transfer on a layer 2 link in an acknowledged mode over an air interface between a mobile station and a network. In order to allow dynamic use of existing resources, a common memory is defined to be shared by at least two parallel layer 2 links and memory is allocated for each parallel layer 2 link from the common memory.

25 Claims, 4 Drawing Sheets

ALLOCATING MEMORY RESOURCES OF MOBILE STATION

FIELD OF THE INVENTION

The invention relates to allocating memory resources for packet data transfer on a layer 2 link in an acknowledged mode over an air interface, and more particularly to allocating the memory resources of a mobile station.

BACKGROUND OF THE INVENTION

A mobile communication system generally refers to any telecommunication system which enables wireless communication when a user is located within the service area of the system. Examples of such systems are cellular mobile communication systems, such as GSM (Global System for Mobile communications), or corresponding systems, such as PCS (Personal Communication System) or DCS 1800 (Digital Cellular System for 1800 MHz), third-generation mobile systems, such as UMTS (Universal Mobile Communication System) and systems based on the above-mentioned systems, such as GSM 2+ systems and the future fourth-generation systems. One typical example of a mobile communication system is the public land mobile network PLMN.

The invention and its background will be discussed below by using a GSM 2+-system called GERAN (GSM/EDGE (Enhanced Data rates for Global Evolution) Radio Access Network) Release 5 Iu as an example yet without limiting the invention thereto. 'Iu' means that mobile stations are connected to a radio access network GERAN that is further connected with Iu interfaces to the core network providing the data transfer.

The protocol architecture of the air interface of GERAN Iu, called Um interface, comprises three protocol layers: a physical layer L1, a data link layer L2 and a network layer L3. The data link layer L2 of GERAN Iu comprises a radio link control RLC sub-layer and a medium access control MAC sub-layer, which are common for a user plane (i.e. for user data) and control plane (i.e. for signaling data). The layers above RLC are PDCP (Packet Data Convergence Protocol) for the user plane and RRC (Radio Resource Control) for the control plane. RLC provides reliable mechanisms, such as an acknowledged mode ARQ for transmission of upper layer data over the air interface.

Each radio bearer has an RLC instance transmitting the radio bearer data for peer-to-peer information change. The RLC instance transmits information by means of data blocks called packet data units over the air interface on an L2 link established for a radio bearer. In the acknowledged mode and in an unacknowledged mode, the L2 link is called a Temporary Block Flow TBF in GERAN. The L2 link, hereinafter called TBF, is a carrier (i.e. allocated radio resource) that supports the unidirectional transfer of packet data units. Each packet data unit PDU originates from a certain RLC instance. At a transmitting site, the RLC instance (an RLC transmitter) forms RLC packet data units by segmenting the upper layer data into PDUs to which layer 2 control information is added. Each PDU is independently protected against degradation caused by the radio channel. At a receiving site, the RLC instance (an RLC receiver) re-assemblies the RLC packet data units into upper layer data.

In the acknowledged mode, a mechanism called a sliding window is used to control the flow of RLC packet data units across TBF in the transmitter. As each packet data unit is transmitted, an upper window edge UWE is incremented by unity. Similarly, as each packet data unit is acknowledged, a lower window edge LWE is incremented by unity/acknowledged packet data unit. The sending of new packet data units is stopped, when the difference between UWE and LWE becomes equal to the size of the RLC send window. The situation is called window stalling. The RLC window size represents the size of an RLC memory reserved for an RLC instance and it should be big enough so that resources allocated to TBF can be benefited. A prior art mobile station supporting multislot capability, i.e. a mobile station capable of using more than one timeslot for one TBF, must support the maximum RLC window size corresponding to its multislot capability. For example, if the mobile station is capable of three timeslots on a downlink and one timeslot on an uplink, the mobile station has to support an RLC window size of 384 in the downlink and 192 in the uplink direction.

The mobile stations according to the GERAN Release 5 Iu may support multiple TBFs allowing several RLC instances run in parallel. Each RLC instance will have an RLC window, i.e. there are as many parallel RLC windows as there are RLC instances running in parallel. If the RLC window sizes are defined according to the prior art, the mobile station should support, for each RLC instance that may run in parallel, the maximum window size corresponding to the number of timeslots the mobile station can at most use for TBF transferring packet data units from the RLC instance. For example, if two RLC instances may run in parallel, both of them being able to use a two-timeslot TBF, the mobile station should support two parallel RLC windows both having an RLC window size of 256. This can also be expressed in another way: if the mobile supports two timeslots and has an RLC memory, the size of which is 512, only two RLC instances are allowed to run in parallel. However, the network may allocate a smaller window size in order to optimize the number of users of the air interface or the memory consumption of the network, for example. Thus, the network may allocate only one timeslot for each TBF of the previous example, the timeslots corresponding to a window size of 64 causing a memory consumption problem: only 25 percent of the memory reserved in the mobile station for the windows would actually be used. The problem can also be seen as unnecessarily limiting the amount of parallel RLC instances: only two RLC instances in parallel are allowed although eight RLC instances with window sizes of 64 could run in parallel. Furthermore, the memory resources in a mobile station are much more limited than in the network, and therefore reserving memory resources in such a manner that for each allowed parallel TBF, a memory resource corresponding to the maximum window size for TBF can be allocated simultaneously, is a waste of limited memory resources and limits unnecessarily the amount of parallel RLC instances. The problem is emphasized when the mobile station is at a receiving site, since the receiver only buffers the packet data units which are correctly received and are waiting for reassembly and transmission to the upper layer. Usually the buffered packet data units require a great deal less memory than the corresponding maximum window size.

BRIEF DESCRIPTION OF THE INVENTION

An object of the present invention is to provide a method and an apparatus for implementing the method so as to overcome the above problem. The object of the invention is achieved by a method, a mobile station, a network and a wireless system, which are characterized by what is stated in the independent claims. The preferred embodiments of the invention are disclosed in the dependent claims.

The invention is based on realizing the problem and solving it by defining a common memory resource for RLC and a mechanism for sharing the common memory between parallel RLC instances. An advantage of the invention is that the size of the memory reserved for RLC can be limited in comparison with the prior art solution in which the same number of parallel RLC instances are supported. Or if the sizes of the memories are the same, the invention allows a bigger maximum number of parallel RLC instances than the prior art solution where the maximum number of parallel RLC instances is the memory divided by the maximum window size according to the mobile station's multislot class.

In the first preferred embodiment of the invention the mechanism is based on reducing and increasing the RLC window size, the size adjustment being performed by means of signaling.

In the second preferred embodiment of the invention, the mechanism is based on the idea of having an RLC buffer for each receiving RLC window, the buffer being smaller than the RLC window and parallel buffers sharing the common memory. The sending side is informed of whether or not the buffer is stalled and the information is used to control the sending.

BRIEF DESCRIPTION OF THE DRAWINGS

In the following, the invention will be described in greater detail by means of preferred embodiments with reference to the attached drawings, in which.

DETAILED DESCRIPTION OF THE INVENTION

The present invention can be applied to any communication system providing data transfer over the air interface. Such systems include the above mentioned systems, for example. In the following the invention will be described by using a GERAN Iu system as an example without restricting the invention thereto. In GPRS (General Packet Radio Service), TBF conveys data from a single RLC instance. In GERAN Iu, an RLC instance is associated only with one radio bearer, but data from one or more RLC instances may be transmitted over one TBF. However, in the following it is assumed for clarity's sake that only one RLC instance is using one TBF.

Figure 1:
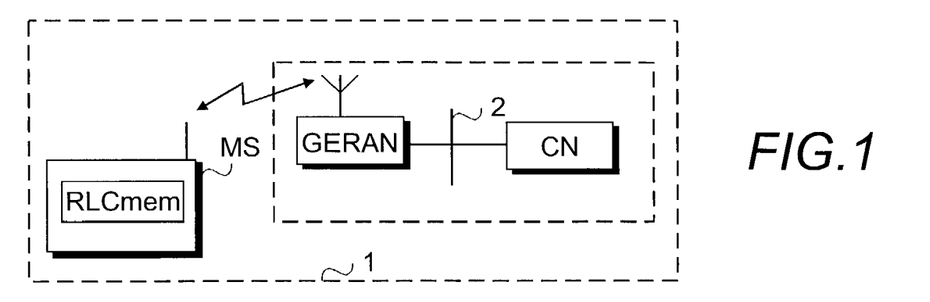
FIG. 1 illustrates the basic parts of a communication system.

FIG. 1 shows a very simplified network architecture illustrating only the basic parts of the communication system 1. It is obvious to a person skilled in the art that the system 1 comprises network nodes, functions and structures, which need not be described in greater detail here.

A mobile station MS comprises the actual terminal and a detachably connected identification card SIM, also called a subscriber identity module. In this context, the mobile station generally means the entity formed by the subscriber identity module and the actual terminal. SIM is a smart card, which comprises a subscriber identity, performs authentication algorithms and stores authentication and cipher keys and subscription information necessary for the user equipment. The actual terminal of the invention can be any equipment capable of communicating in a mobile communication system and supporting multiple parallel traffic flows. The terminal can thus be a simple terminal intended only for speech, or it can be a terminal for various services, operating as a service platform and supporting the loading and carrying out of different service-related functions. The terminal can also be a combination of various devices, for example a multimedia computer with a Nokia card phone connected to it to provide a mobile connection.

The mobile station according to the first preferred embodiment of the invention comprises a common memory RLCmem for RLC, the size of which is preferably at least the maximum RLC window size corresponding to the multislot capability of MS. The size is usually expressed as a number of RLC blocks. For example, when MS is capable of eight timeslots in one direction, the size of RLCmem is preferably at least 1024, i.e. there can be 1024 RLC blocks in the window. The mobile station also comprises an allocation functionality for allocating RLC windows for TBFs from RLCmem and a window size adaptation functionality to increase/reduce the window sizes. In the first preferred embodiment of the invention, it is assumed that the minimum requirement for the RLC window size is 64 and the memory resolution is 32. In other embodiments, the minimum size and/or the memory resolution may be something else. In other words, in the first preferred embodiment of the invention, an RLC window size may be increased and decreased by multiples of 32, TBF may be established between the mobile station and the network if an RLC window the size of which is at least 64 can be allocated for this TBF, and the size of an RLC window cannot be reduced to less than 64.

In the second preferred embodiment of the invention, the mobile station MS comprises a common memory RLCmem shared by receiving buffers for receiving RLC instances. The common memory can be called RX mem. The receiving buffer is called RX buffer here. The size of the RX buffer can be smaller than the size of the RLC window allocated for the RLC instance at the transmitting site. When the size of the RX buffer is smaller, the amount of physical memory needed for received RLC data of TBF is smaller. Whenever a new downlink TBF is established or an existing downlink TBF released, the sizes of other RX buffers are adjusted as described later. In the second preferred embodiment of the invention, the mobile station is arranged to indicate in ack/nack messages ('packet downlink ack' or 'packet downlink nack') by means of one bit whether the RX buffer is overflowing or not. The network utilizes this information for adjusting polling. In the second preferred embodiment of the invention, a polling mechanism is used in acknowledging the packet data units the network sends to the mobile station MS. In other words, after sending a certain number of packet data units, the network requests the mobile station to acknowledge the packet data units. In response to the request, the mobile station sends an acknowledgement and, in response to the acknowledgement, the network resends the packet data units which were negatively acknowledged. The RLC packet data units received after the RX buffer overflowed can be stored in RLCmem if other RX buffers have not overflown. The RLC packet data units received after all the RX buffers have overflown are negatively acknowledged.

In the third preferred embodiment of the invention, the mobile station MS comprises a common memory RLCmem for the transmitting RLC instances, an allocation functionality for allocating RLC windows for TBFs from RLCmem, a window size adaptation functionality to increase/reduce the window sizes and a common memory, RX mem, for the RX buffers. In other words, when the mobile station is the transmitter, RCLmem is used, and when the mobile station is the receiver, RX mem is used. In the third preferred embodiment of the invention, the network utilizes the polling functionality and the active window size. In other words, the third preferred embodiment of the invention is a combination of the first and second preferred embodiments where RLCmem is used for uplink TBFs and RX mem for downlink TBFs.

In another embodiment of the invention, based on the third preferred embodiment of the invention, one single common memory is shared between transmitting TBFs and receiving TBFs. In the embodiment, an extra memory allocation function defining how the memory is allocated to RLCmem and RXbuffer needs to be defined. The memory allocation function may be based on actual needs weighted by different factors for uplink needs and downlink needs, for example.

The mobile station of the first or second preferred embodiment of the invention is arranged to indicate to the network 3 within its MS RAC (Mobile Station Radio Access Capabilities) the common RLCmem it has in the same way as a window size is calculated according to the prior art. In the third preferred embodiment of the invention, the mobile station may be arranged to indicate within its MS RAC preferably both the RLCmem and the RX mem. However, if the mobile station does not know the size of the memory it has for RX buffers, the mobile station may not send any information on its memory resources to the network. In some other embodiments of the invention the MS indicates within the MS RAC the maximum number of the acknowledged-mode TBFs it can support. The network uses this information when allocating resources for MS. MS RAC can be sent when MS attaches to the network (attach procedure) or during the establishment of an RRC connection, for example.

In the example of FIG. 1, the system 1 comprises a network 3 with a core network CN and a radio access network GERAN. GERAN is formed of a group of radio network subsystems (not shown in FIG. 1), such as base station subsystems of GSM, which are connected to the core network CN via a so-called Iu-interface 2. GERAN may be a GSM/EDGE Radio Access Network and CN may be a GSM/UMTS core network. The network comprises at least one packet control unit, which is in charge of RLC and which is configured to perform at least some of the functions disclosed below. The packet control unit is typically located in a network node of GERAN. The packet control unit is typically located in a base station controller BSC, but it can be in a base station BS or in a GPRS support node GSN, for example. BSC and BS are nodes in GERAN, whereas GSN is a node in CN.

In addition to the prior art means, the mobile stations of the system implementing the functions of the present invention comprise a common memory for RLC and means for managing memory allocation. The network of the system may comprise means for adapting its window size allocation to correspond to the memory allocation of a mobile station and/or means for guiding the mobile station to allocate the memory. The current network nodes and mobile stations comprise processors and memory, which can be utilized in the functions according to the invention. All changes necessary for implementing the invention can be made by added or updated software routines, and/or by routines included in application-specific integrated circuits (ASIC) and/or programmable circuits, such as EPLD, FPGA.

Figure 2:
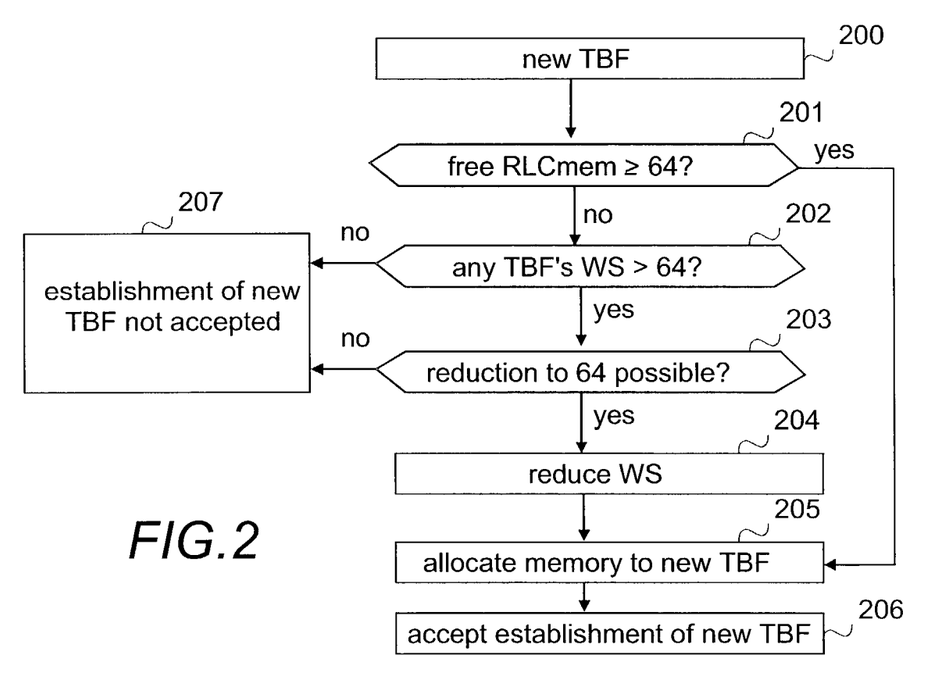
FIGS. 2, 3 and 4 illustrate memory allocation and adjustment according to a first preferred embodiment of the invention.

FIG. 2 illustrates RLC memory allocation for one TBF in the first preferred embodiment of the invention. A new TBF is introduced in step 200 and in response to this the mobile station checks, in step 201, if the size of the free RLC memory RCLmem is at least 64. If it is not, it is checked, in step 202, if there is at least one TBF having more memory than 64. In other words, it is checked whether there is any TBF having window size WS bigger than 64. If there is, it is checked, in step 203, can the window sizes of the TBFs having bigger size than 64 be reduced so that the reduction is altogether at least 64. In other words, it is checked whether or not it is possible to free at least 64 from the memory so that each of the already existing TBFs would still have a window size of at least 64. If it is possible, the window size or window sizes are reduced in step 204. The reduction is disclosed in more detail with FIG. 3. After reduction, the freed memory is allocated to the new TBF in step 205 and the establishment of the new TBF is accepted in step 206.

If the size of the free memory is at least 64 (step 201), the free memory is allocated to the new TBF (step 205) and the establishment of the new TBF is accepted (step 206).

If there is no TBF having more memory than 64 (step 202) or the memories cannot be reduced at least 64 (step 203), the establishment of the new TBF is not accepted (step 207).

Figure 3:
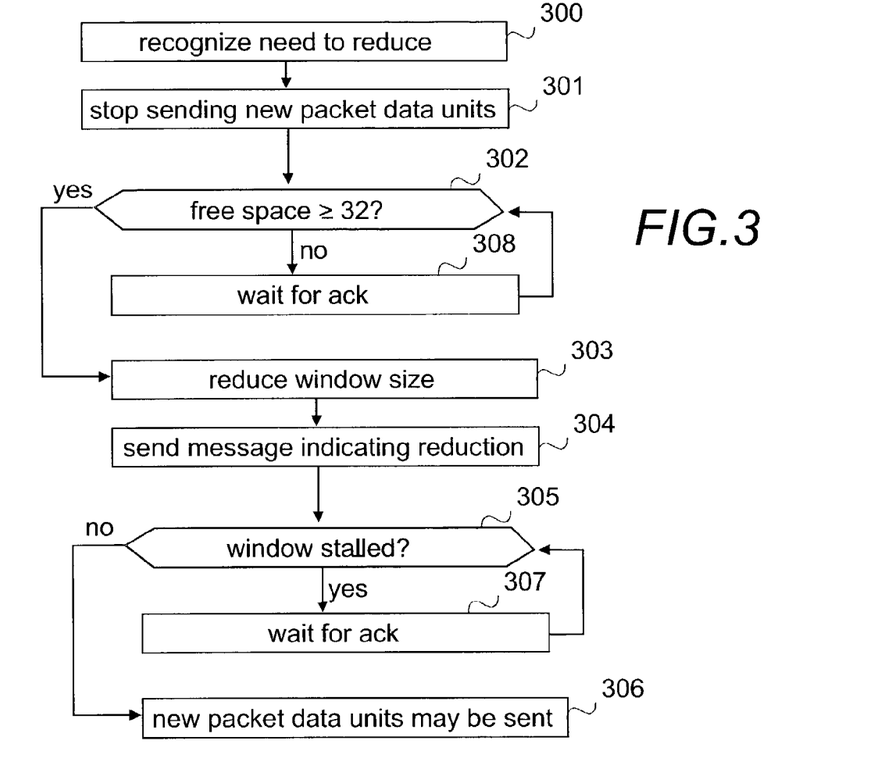

FIG. 3 illustrates the memory size reduction procedure according to the first preferred embodiment of the invention, when a need to reduce the window size is recognized in the transmitter of RLC packet data units in step 300. In the first preferred embodiment of the invention, it is assumed that a sliding window is used. The transmitter can be the mobile station or the network, i.e. the reduction can be made both in the uplink and downlink directions. In response to recognizing the need, the sending of new packet data units is stopped in step 301. By stopping the sending, the dropping of not yet acknowledged RLC packet data units can be avoided. Then, in step 302, it is checked, if the window has at least 32 of free space (free block). If there is, the window size is reduced in step 303 and a message indicating the reduction is sent to the receiver in step 304. The reduction is 32 or its multiples. The message can be any message relating to a corresponding TBF sent between the mobile station and the network, for example, a 'packet uplink assignment', 'packet downlink assignment' or 'packet timeslot reconfigure'. Then, it is checked in step 305, if the new, smaller window is stalled. If it is not, new packet data units may be sent (step 306). If the new, smaller window is stalled, an acknowledgement of a previously sent packet data unit is waited for (step 307) and after it is received, it is again checked, if the window is stalled (step 305).

If there is not enough free space (step 302), an acknowledgement of a previously sent packet data unit is waited for in step 308 and after it is received, it is again checked, if there is enough free space (step 302).

Since the reduction of the window size is controlled by the transmitter, there is no risk even if the message sent in step 304 was never received in the receiver, because with a smaller window there can be less packet data units waiting for acknowledgement.

In one embodiment of the invention, the window is allowed to slide after step 301 thus possibly allowing a larger reduction.

Figure 4:
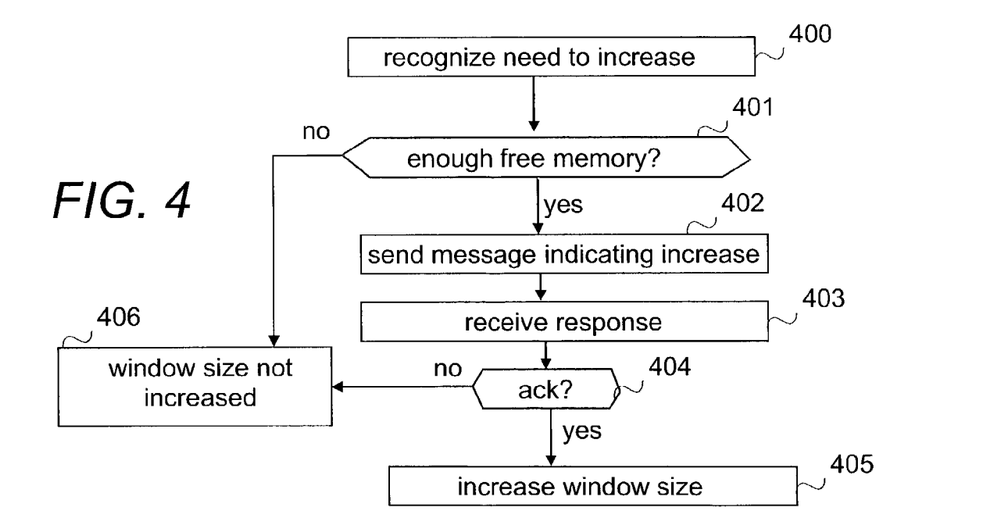

FIG. 4 illustrates the memory size increasing procedure according to the first preferred embodiment of the invention, when a need to increase the window size is recognized in the transmitter in step 400. In response to recognizing the need, it is checked, in step 401, if there is enough free memory. If there is, a message indicating how much the window size is going to be increased is sent to the receiver in step 402. The message can be a 'packet uplink assignment', 'packet downlink assignment' or 'packet timeslot reconfigure', for example, i.e. the same message as used with the reduction. Then, a response is received from the receiver in step 403 and it is checked, in step 404, if the response was an acknowledgement indicating that the increase succeeded in the receiver. If it was an ack, the window size is increased in step 405 and after that, the bigger window size is used. If the response was a negative acknowledgement nack, the window size is not increased (step 406).

If there is not enough free memory (step 401), the window size is not increased (step 406).

Although the first preferred embodiment has been described above assuming that parallel receiving and transmitting RLC instances of the mobile station share one common memory, it is obvious for a person skilled in the art how to implement the first preferred embodiment of the invention if only either the receiving RLC instances of the mobile station or the transmitting RLC instances of the mobile station share the common memory.

In the second preferred embodiment of the invention, the transmitting network adjusts its polling policy according to the allocated resources for each receiving RLC instance in the mobile station. In the second preferred embodiment of the invention, it is assumed that each receiving RLC instance has its RX buffer, and the size of RX buffer depends on the amount of RLC instances and timeslots allocated for the corresponding TBF. For example, if there is only TBF1 with two timeslots, the whole RX mem is allocated for RX buffer1. When a second TBF, TBF2 with one timeslot, is established, running in parallel with TBF1, the size of RX buffer 1 is decreased to be two thirds of RX mem and the size of RX buffer 2 will be one third of RX mem, for example. When TBF2 is released, the size of RX buffer 1 is increased to be the same as the size of RX mem. It should be emphasized that some other memory allocation principles may be used as well, the above being only an illustrative example.

In the second preferred embodiment of the invention, the network uses WS_a, i.e. WS_active, as a polling parameter or as a basis for determining the polling parameter which indicates the number of sent packet data units triggering the network to request the mobile station to acknowledge the packet data units. WS_a can also be considered to be a transmitter's estimate about the receiver's buffer size. In the second preferred embodiment of the invention, the network adapts WS_a to be equal to or smaller than the corresponding RX buffer to prevent extra errors that would occur if the transmitter transmitted packet data units as if the RX buffer was as big as the transmitting window size. However, when the transmitting window size is bigger, the transmission can continue while the acknowledgement is waited for.

Figure 5:
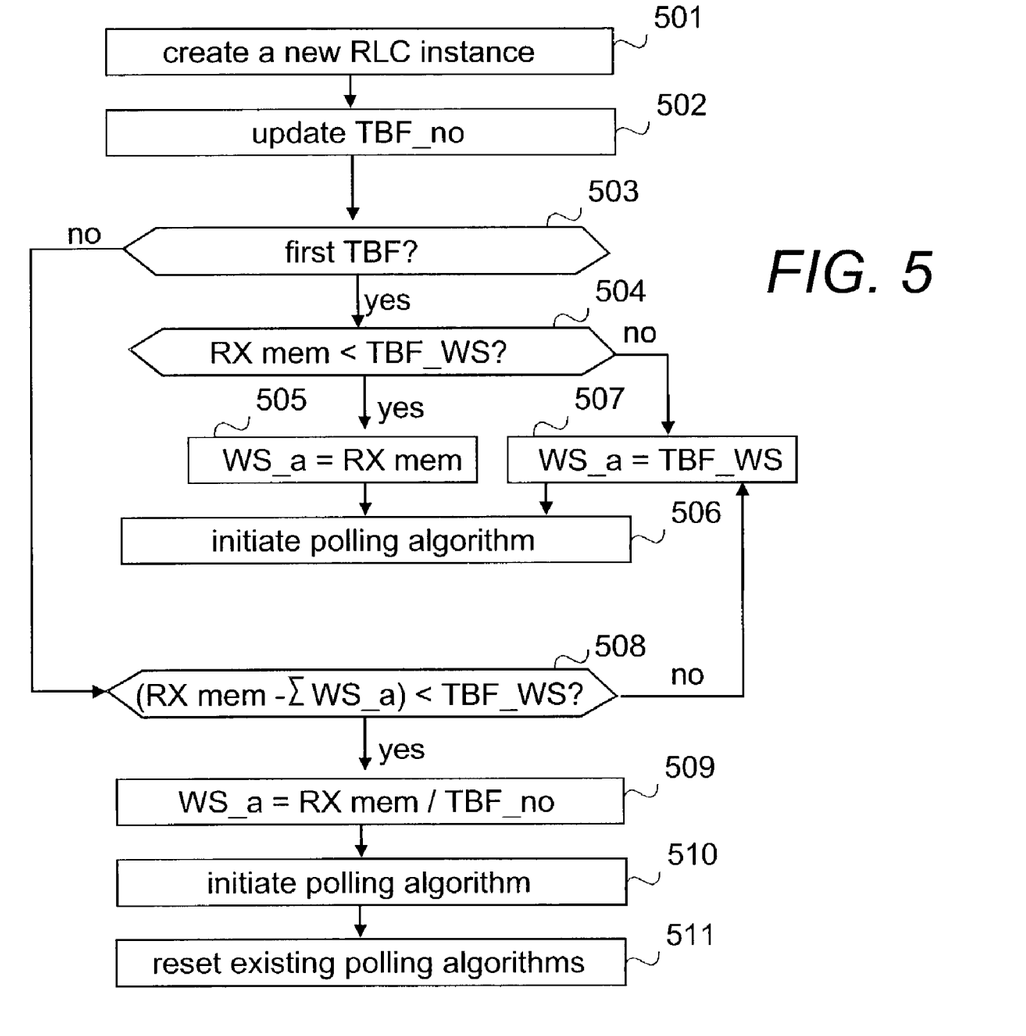
FIGS. 5, 6 and 7 illustrate a second preferred embodiment of the invention.

FIG. 5 illustrates the functionality according to the second preferred embodiment of the invention in a situation where the network knows the size of the common memory RX mem for RX buffers. For clarity's sake it is assumed that all transmitting windows have the same WS_a.

Referring to FIG. 5, a new RLC instance is created in step 501, and one TBF is established for the RLC instance. For clarity's sake it is assumed that the establishment of TBF succeeds, and thus TBF_no indicating the number of existing TBFs between the network and the mobile station is updated in step 502. Then it is checked, in step 503, if TBF is the first TBF, i.e., is TBF_no one. If it is, it is checked, in step 504, if the size of the RX mem is smaller that the window size TBF_WS allocated to this TBF. If it is, WS_a is set to RX mem in step 505 and the polling algorithm is initiated in step 506. If the size of RX mem is not smaller than TBF WS (step 504), WS_a is preferably set to TBF_WS in step 507 and the polling algorithm is initiated in step 506. WS_a may be set to any positive value, which is smaller than TBF_WS in step 507.

If TBF is not the first TBF (step 502), it is checked, in step 508, is TBF_WS bigger than RX mem subtracted by the sum of existing TBF WS_a's. If it is not, the process continues in step 507 where WS_a is set to TBF_WS. If it is, RX mem is divided by TBF_no and the outcome is set to be WS_a in step 509. Then the polling algorithm for this TBF is initiated in step 510 and existing polling algorithms are reset in step 511 to correspond the new WS_a value.

In some other embodiment of the invention, where RX mem is known and the polling algorithm is independent from WS_a, the process disclosed in FIG. 5 proceeds after the steps where WS_a is set (e.g. steps 505 and 509) to FIG. 3, step 300. (And correspondingly, when WS_a is increased, to FIG. 4, step 400.)

Figure 6:
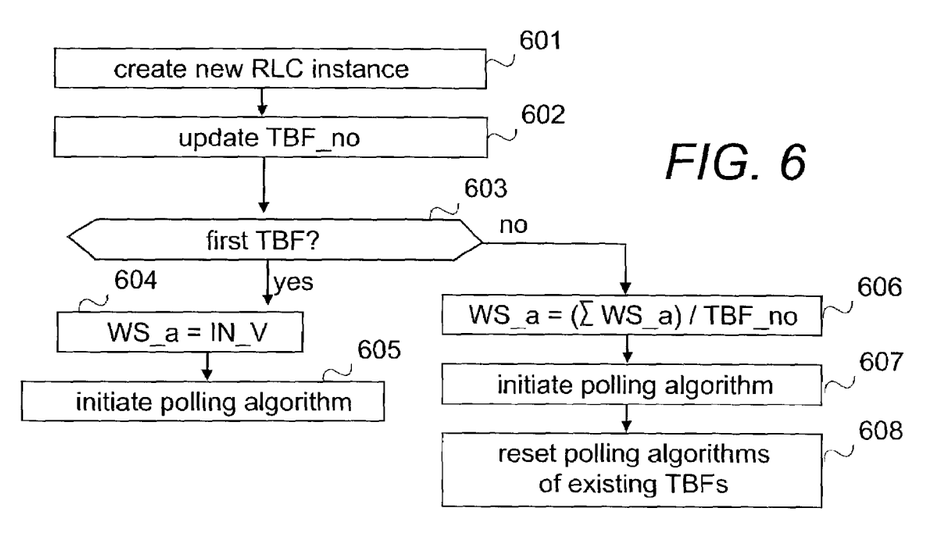

FIG. 6 illustrates the functionality according to the second preferred embodiment of the invention in a situation where the network does not know the size of the common memory RX mem for RX buffers. For clarity's sake it is assumed that all transmitting windows have the same WS_a.

Referring to FIG. 6, a new RLC instance is created in step 601, and for the RLC instance one TBF is established. For clarity's sake it is assumed that the establishment of TBF succeeds, and thus TBF_no indicating the number of existing TBFs between the network and the mobile station is updated in step 602. Then it is checked, in step 603, is TBF the first TBF, i.e., is TBF_no one. If it is, WS_a is set to an initial value IN_V in step 604 and the polling algorithm is initiated in step 605. The initial value can be any positive value, such as 10 percent of the window size allocated to TBF or 64, for example. The initial value is the network's best guess for the size of RX mem.

If TBF is not the first TBF (step 602), the sum of existing TBF WS_a's is divided by TBF_no and the outcome is set to be WS_a in step 606. Then the polling algorithm for this TBF is initiated in step 607 and the existing polling algorithms are reset in step 608 to correspond to the new WS_a value.

When an existing TBF is released, WS_a is increased by updating TBF_no and determining WS_a according to the above principles (however, the sum of WS_a's will still have the WS_a value for the released TBF). After the increase of WS_a, the polling algorithms are reset.

For example, in situations, where the network first knows RX mem, but loses the information for some reason, the network is arranged to perform either the steps of FIG. 5 or FIG. 6.

Figure 7:
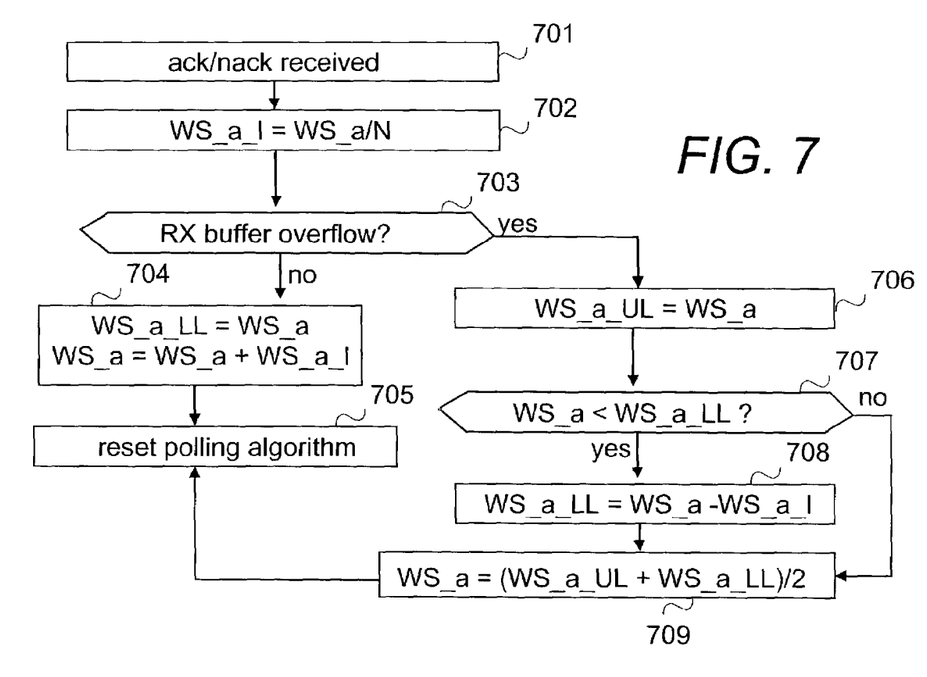

In the second preferred embodiment of the invention, the mobile station sends in the acknowledgments information on whether or not RX buffer is overflowing. FIG. 7 illustrates one example of how the network utilizes this information to optimize the functionality of the polling algorithm so that the air interface is not loaded in vain with requests or packet data units which cannot be received because of the buffer being stalled. It should be understood that the forms used in FIG. 7 to set new values are purely illustrative and values can be defined in very many ways.

Referring to FIG. 7, an ack or a nack is received in step 701. An increment WS_a_I is calculated in step 702 by dividing WS_a by N, N being preferably an integer, for example 4. N can be a constant or depend on the amount of existing TBFs or the window sizes allocated to the existing TBFs. Then, in step 703, it is checked, if the RX buffer is overflowing. If not, in step 704, the lower limit, WS_a_LL, for the WS_a is set to WS_a, and WS_a is increased by the increment WS_a_I. Then, the polling algorithms are reset in step 705.

If the RX buffer was overflowing (step 703), the upper limit, WS_a_UL, for the WS_a is set in step 706 to WS_a. Then it is checked, in step 707, if the WS_a is smaller than the lower limit WS_a_LL. If step 707 is performed without performing step 704, a default value is used for the WS_a_LL. The default value can be 4, for example. For clarity's sake setting the default value is not shown in FIG. 7. If the WS_a is smaller than the lower limit WS_a_LL (step 707), the lower limit WS_a_LL is decreased by the increment WS_a_I in step 708 and a new WS_a value is calculated in step 709 by adding the upper limit WS_a_UL and the lower limit WS_a_LL and dividing the outcome by 2. After that the polling algorithms are reset in step 705.

If WS_a was not smaller than the lower limit (step 707), the new WS_a value is calculated in step 709 and the polling algorithms are reset in step 705.

Although the second preferred embodiment of the invention has been described assuming that WS_a is the same for all TBFs, it is obvious for one skilled in the art, how to implement the invention when each TBF has an individual WS_a.

The steps in FIGS. 2 to 7 are not in an absolute chronological order. For example, some of the steps described above may take place simultaneously, or in another order. Some steps may be skipped, such as step 508 of FIG. 5. Correspondingly, other steps not shown in FIGS. 2 to 7 may take place between the steps mentioned above. The steps may also be replaced with steps where values are calculated and/or set differently from what is disclosed above.

Although the invention has been described above assuming, for example, that all the receiving RLC instances share the common memory, it is obvious to one skilled in the art how to implement the invention when only some of the receiving RLC instances share the common memory and how to allocate a dedicated memory for the other receiving RLC instances.

Although the invention has been described above assuming that only one RLC instance is using TBF, it is obvious to one skilled in the art, how to implement the invention when multiple RLC instances using TBF run in parallel in the mobile station.

Although the invention has been described above assuming that the shared memory resource is in the mobile station, it is obvious to one skilled in the art, how to implement the invention when the shared memory resource is on the network side.

It will be obvious to a person skilled in the art that, as the technology advances, the inventive concept can be implemented in various ways. The invention and its embodiments are not limited to the examples described above but may vary within the scope of the claims.

The invention claimed is:

1. A method of allocating memory resources in a wireless communication system in which data may be transferred in an acknowledged mode across a layer 2 link between a mobile station and a network, the method comprising:
   defining a common memory in a mobile station of the wireless communication system, said memory to be shared by at least two parallel layer 2 links; and
   allocating and releasing memory for the parallel layer 2 links from the common memory.

2. A mobile station comprising:
   a transceiver to receive and to transfer data in an acknowledged mode across a layer 2 link between the mobile station and a network;
   a common memory to be shared by at least two parallel layer 2 links; and
   a memory allocation mechanism to allocate and to release memory resources from the common memory for a layer 2 link and to adjust allocated memory resources for existing layer 2 links.

3. The mobile station of claim 2, further comprising:
   an indicator to indicate to the network the size of the common memory.

4. A network in a wireless communication to support data transfer in an acknowledged mode across a layer 2 link between a mobile station and the network, the network comprising:
   a mechanism to define and update a polling parameter for data transfer over the layer 2 link on the basis of how many layer 2 links are sharing in parallel a common memory to be shared by the parallel layer 2 links in the mobile station.

5. A wireless communication system to support data transfer in an acknowledged mode across a layer 2 link between a mobile station and a network, the system comprising:
   a common memory of the mobile station to be shared by at least two parallel layer 2 links; and
   a memory allocation mechanism to allocate and release memory resources from the common memory for a layer 2 link and to adjust allocated memory resources for existing layer 2 links.

6. The wireless system of claim 5, wherein the memory allocation mechanism is configured to adjust the allocated memory resources by means of signaling.

7. The wireless system of claim 5, further comprising:
   in a transmitting site, a mechanism to define and update a polling parameter for data transfer over the layer 2 link on the basis of how many layer 2 links are sharing in parallel the common memory in a receiving site.

8. The wireless system of claim 7, wherein
   the receiving site of the layer 2 link is configured to inform the transmitting site whether or not the memory allocated for the layer 2 link in the receiving site is overflowing; and
   the transmitting site is configured to update the polling parameter on the basis of the information.

9. The wireless communication system of claim 7, wherein the transmitting site is contained in the mobile station, the mobile station including the common memory, and wherein the network includes the receiving site.

10. The wireless communication system of claim 7, wherein the network includes the transmitting site, and wherein the mobile station includes the common memory and includes the receiving site.

11. A mobile station, comprising:
    means for receiving and transferring data in an acknowledged mode across a layer 2 link between the mobile station and a network;
    a common memory means to be shared by at least two parallel layer 2 links; and
    a memory allocation means to allocate and release memory resources from the common memory for a layer 2 link, and to adjust allocated memory resources for existing layer 2 links.

12. The mobile station of claim 11, further comprising:
    means for indicating a size of the common memory to the network.

13. The method of claim 1, further comprising:
    adjusting allocated memory resources for existing layer 2 links.

14. The method of claim 1, further comprising:
    defining and updating a polling parameter for data transfer over the layer 2 link based on how many layer 2 links are sharing in parallel the common memory.

15. The method of claim 1, further comprising:
    providing software that, when executed by a processor, causes the processor to perform said defining and said allocating.

16. The method of claim 1, further comprising:
obtaining software that, when executed by a processor, causes the processor to perform said defining and said allocating.

17. A processor-readable memory medium containing software that, when executed by a processor, causes the processor to execute a method comprising:
defining a common memory of a mobile station of a wireless communication system, the common memory to be shared by at least two parallel layer 2 links; and
allocating and releasing memory for the parallel layer 2 links from the common memory.

18. The medium of claim 17, wherein the method further comprises:
adjusting allocated memory resources for existing layer 2 links.

19. The medium of claim 17, wherein the method further comprises:
defining and updating a polling parameter for data transfer over the layer 2 link based on how many layer 2 links are sharing in parallel the common memory.

20. A method of allocating memory resources in a wireless communication system to support data transfer in an acknowledged mode across a layer 2 link between a transmitter and a receiver, the method comprising:
defining a common memory to be shared by at least two parallel layer 2 links; and allocating and releasing memory for the parallel layer 2 links from the common memory; and
defining and updating a polling parameter for data transfer over the layer 2 link based on how many layer 2 links are sharing in parallel the common memory.

21. A wireless communication system to support data transfer in an acknowledged mode across a layer 2 link between a mobile station and a network, the system comprising:
a common memory to be shared by at least two parallel layer 2 links; and
a memory allocation mechanism to allocate and release memory resources from the common memory for a layer 2 link and to adjust allocated memory resources for existing layer 2 links; and
in a transmitting site, a mechanism to define and update a polling parameter for data transfer over the layer 2 link on the basis of how many layer 2 links are sharing in parallel the common memory in a receiving site.

22. The wireless system of claim 21, wherein
the receiving site of the layer 2 link is configured to inform the transmitting site whether or not the memory allocated for the layer 2 link in the receiving site is overflowing; and
the transmitting site is configured to update the polling parameter on the basis of the information.

23. The wireless communication system of claim 21, wherein the transmitting site is contained in the mobile station, the mobile station including the common memory, and wherein the network includes the receiving site.

24. The wireless communication system of claim 21, wherein the network includes the transmitting site, and wherein the mobile station includes the common memory and includes the receiving site.

25. A processor-readable memory medium containing software that, when executed by a processor, causes the processor to execute a method comprising:
defining a common memory to be shared by at least two parallel layer 2 links;
allocating and releasing memory for the parallel layer 2 links from the common memory; and
defining and updating a polling parameter for data transfer over the layer 2 link based on how many layer 2 links are sharing in parallel the common memory.

* * * * *

UNITED STATES PATENT AND TRADEMARK OFFICE
CERTIFICATE OF CORRECTION

PATENT NO.         : 7,573,844 B2                                                        Page 1 of 1
APPLICATION NO.    : 10/301862
DATED              : August 11, 2009
INVENTOR(S)        : Guillaume Sébire et al.

It is certified that error appears in the above-identified patent and that said Letters Patent is hereby corrected as shown below:

Claim 1, column 9, line 47, please amend "in which data may be transferred" to read "to support data transfer"; and Claim 1, column 9, lines 48-49, please amend "mobile station and a network" to read "transmitter and a receiver".

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,573,844 B2
APPLICATION NO. : 10/301862
DATED : August 11, 2009
INVENTOR(S) : Sébire et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1973 days.

Signed and Sealed this

Fourteenth Day of December, 2010

David J. Kappos
*Director of the United States Patent and Trademark Office*